(12) United States Patent
Seo et al.

(10) Patent No.: US 12,365,813 B2
(45) Date of Patent: Jul. 22, 2025

(54) COVER WINDOW AND DISPLAY DEVICE INCLUDING THE SAME

(71) Applicant: SAMSUNG DISPLAY CO., LTD., Yongin-si (KR)

(72) Inventors: Hyun Seung Seo, Gwacheon-si (KR); Hui Yeon Shon, Seongnam-si (KR); Yong Kyu Kang, Hwaseong-si (KR); Ji Hyun Ko, Suwon-si (KR); Hyun Kyung Yun, Namyangju-si (KR); Dong-Sung Lee, Hwaseong-si (KR); Chang Moo Lee, Suwon-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 116 days.

(21) Appl. No.: 17/140,313

(22) Filed: Jan. 4, 2021

(65) Prior Publication Data
US 2021/0277280 A1 Sep. 9, 2021

(30) Foreign Application Priority Data
Mar. 6, 2020 (KR) .......... 10-2020-0028436

(51) Int. Cl.
*G02B 1/14* (2015.01)
*C08J 7/046* (2020.01)
(Continued)

(52) U.S. Cl.
CPC ............ *C09D 183/08* (2013.01); *C08J 7/046* (2020.01); *C09D 183/04* (2013.01); *C09D 183/06* (2013.01); *G02B 1/14* (2015.01)

(58) Field of Classification Search
CPC ... C08J 7/046; G02F 1/1333; G02F 1/133311; G02F 1/133331; G02F 1/133305;
(Continued)

(56) References Cited

U.S. PATENT DOCUMENTS 10,876,018 B2 12/2020 Heo et al.
2003/0087102 A1* 5/2003 Yamaya .................. C08J 7/046
428/419
(Continued)

FOREIGN PATENT DOCUMENTS

CN 103121310 A 5/2013
CN 107797165 A 3/2018
(Continued)

OTHER PUBLICATIONS

Zeldin, M, book chapter titled "Polymers, Inorganic and Organometallic", from Encyclopedia of Physical Science and Technology, p. 675. https://www.sciencedirect.com/referencework/9780122274107/encyclopedia-of-physical-science-and-technology.*

*Primary Examiner* — Z. Jim Yang
(74) *Attorney, Agent, or Firm* — F. CHAU & ASSOCIATES, LLC

(57) ABSTRACT

A cover window includes a base layer. A first hard coating layer is disposed on a first side of the base layer. A second hard coating layer is disposed on the first hard coating layer. The first hard coating layer comprises an acryl-based organic-inorganic material and the second hard coating layer comprises a silicon-based or epoxy-based organic-inorganic material; or the first hard coating layer comprises the silicon-based or the epoxy-based organic-inorganic material and the second hard coating layer comprises the acryl-based organic-inorganic material.

20 Claims, 9 Drawing Sheets

(51) Int. Cl.
  *C09D 183/04* (2006.01)
  *C09D 183/06* (2006.01)
  *C09D 183/08* (2006.01)
(58) Field of Classification Search
  CPC ........... G02B 1/11; G02B 1/111; G02B 1/113;
      G02B 1/115; G02B 1/14; C03C 17/006;
      C03C 17/008; C03C 17/009; C03C 17/30;
      C09D 183/04–12
  See application file for complete search history.

(56) References Cited

U.S. PATENT DOCUMENTS

| | | | |
|---|---|---|---|
| 2009/0256287 A1* | 10/2009 | Fu | B82Y 10/00 528/33 |
| 2013/0130002 A1* | 5/2013 | Lee | G02B 1/14 428/411.1 |
| 2016/0289407 A1* | 10/2016 | Park | C08G 75/02 |
| 2017/0064845 A1* | 3/2017 | Jung | H05K 1/028 |
| 2017/0174938 A1* | 6/2017 | Shin | C08J 7/043 |
| 2018/0066152 A1 | 3/2018 | Lee et al. | |
| 2018/0142127 A1* | 5/2018 | Park | C08G 59/3281 |
| 2018/0327634 A1* | 11/2018 | Heo | C09D 183/04 |
| 2019/0138127 A1 | 5/2019 | Seo et al. | |
| 2020/0056056 A1* | 2/2020 | Ahn | C09D 163/00 |
| 2020/0061967 A1* | 2/2020 | Cho | B32B 27/365 |
| 2020/0062991 A1* | 2/2020 | Ahn | C09D 183/06 |
| 2020/0062996 A1* | 2/2020 | Kikuchi | B32B 27/28 |
| 2020/0064519 A1* | 2/2020 | Ahn | C09D 5/006 |
| 2020/0398542 A1* | 12/2020 | Kitamura | C08J 5/18 |
| 2020/0399502 A1* | 12/2020 | Nakamura | C09D 7/61 |
| 2021/0096280 A1* | 4/2021 | Kim | G02B 1/14 |
| 2021/0100120 A1* | 4/2021 | Ahn | D06N 7/0042 |
| 2021/0380474 A1* | 12/2021 | Brandenburg | C03C 17/32 |
| 2022/0017776 A1* | 1/2022 | Shimizu | C08F 299/08 |

FOREIGN PATENT DOCUMENTS

| | | | | |
|---|---|---|---|---|
| CN | 108102540 A | 6/2018 | | |
| CN | 108864938 A | 11/2018 | | |
| JP | 2006-058574 | 3/2006 | | |
| JP | 2010-058476 | 3/2010 | | |
| KR | 10-1168073 | 7/2012 | | |
| KR | 10-1413900 | 6/2014 | | |
| KR | 10-2018-0058912 | 6/2018 | | |
| KR | 10-2013-0055311 | 5/2019 | | |
| KR | 10-2019-0052730 | 5/2019 | | |
| WO | WO-2019188442 A1 * | 10/2019 | | B32B 27/08 |
| WO | WO-2020041032 A1 * | 2/2020 | | B32B 17/06 |
| WO | WO-2020141830 A1 * | 7/2020 | | C08G 77/04 |

\* cited by examiner

COVER WINDOW AND DISPLAY DEVICE INCLUDING THE SAME

CROSS-REFERENCE TO RELATED APPLICATION

This application claims priority under 35 U.S.C. § 119 to Korean Patent Application No. 10-2020-0028436, filed on Mar. 6, 2020 in the Korean Intellectual Property Office, the disclosure of which is incorporated by reference in its entirety herein.

TECHNICAL FIELD

The present inventive concepts relate to a cover window and a display device including the same.

DISCUSSION OF RELATED ART

Current display devices include a liquid crystal display (LCD), light emitting display device (OLED), and the like.

Display devices may include a display panel that displays an image and a cover window that protects the display panel.

Glass may be used as a material for the cover window. However, glass is easily broken by an external impact and it is susceptible to damage when applied to portable devices such as mobile devices.

Accordingly, in recent years, cover windows made of plastic materials instead of glass have been researched. However, many recent display devices include a touchscreen function in which, a pointed tool such as a hand or pen frequently contacts a front side of the cover window. Therefore, the front surface of the cover window that is made of plastic may easily be scratched.

Therefore, a hard coating layer may be formed in the cover window. However, the cover window may be bent as the hard coating layer contracts during a curing process which leads to a deformation and/or decreased performance of the cover window.

SUMMARY

Exemplary embodiments of the present inventive concepts include a cover window that may be prevented from bending, and a display device including the same.

According to an exemplary embodiment of the present inventive concepts, a cover window includes a base layer. A first hard coating layer is disposed on a first side of the base layer. A second hard coating layer is disposed on the first hard coating layer. The first hard coating layer comprises an acryl-based organic-inorganic material and the second hard coating layer comprises a silicon-based or epoxy-based organic-inorganic material; or the first hard coating layer comprises the silicon-based or the epoxy-based organic-inorganic material and the second hard coating layer comprises the acryl-based organic-inorganic material.

In an exemplary embodiment, the acryl-based organic-inorganic material may be polysilsesquioxane containing an acryl group, the silicon-based organic-inorganic material may be polysilsesquioxane containing a silicone group, and the epoxy-based organic-inorganic material may be polysilsesquioxane containing an epoxy group.

In an exemplary embodiment, a thickness of the first hard coating layer and a thickness of the second hard coating layer may be respectively about 10 μm to about 30 μm.

In an exemplary embodiment, a ratio of a thickness of the first hard coating layer and a thickness of the second hard coating layer may be 1:1.5 to 1.5:1.

In an exemplary embodiment, a sum of a thickness of the first hard coating layer and a thickness of a second hard coating layer may be about 40 μm to about 60 μm.

A display device an exemplary embodiment of the present inventive concepts includes: a cover window; and a display panel that is disposed on one side of the cover window, wherein the cover window includes: a base layer, a first hard coating layer that is disposed on one side of the base layer; a first hard coating layer that is disposed on one side of the base layer; and a second hard coating layer that is disposed on the first hard coating layer, wherein the first hard coating layer includes an acryl-based organic-inorganic material and the second hard coating layer includes a silicon-based or epoxy-based organic-inorganic material, or the first hard coating layer includes a silicon-based or epoxy-based organic-inorganic material and the second hard coating layer includes an acryl-based organic-inorganic material, and wherein a hard coating layer is not provided between a base layer of the cover window and the display panel According to an exemplary embodiment of the present inventive concepts, a cover window includes a base layer. A first hard coating layer is disposed on a first side of the base layer. A second hard coating layer is disposed on the first hard coating layer. A third hard coating layer is disposed on the second hard coating layer. The first hard coating layer and the third hard coating layer comprise an acryl-based organic-inorganic material and the second hard coating layer comprises a silicon-based or epoxy-based organic-inorganic material; or the first hard coating layer and the third hard coating layer each comprise at least one material selected from the silicon-based organic-inorganic material and the epoxy-based organic-inorganic material and the second hard coating layer comprises the acryl-based organic-inorganic material.

In an exemplary embodiment, the acryl-based organic-inorganic material may be polysilsesquioxane containing an acryl group, the silicon-based organic-inorganic material may be polysilsesquioxane containing a silicone group, and the epoxy-based organic-inorganic material may be polysilsesquioxane containing an epoxy group.

In an exemplary embodiment, a thickness of the first hard coating layer and a thickness of the third hard coating layer may be respectively about 10 μm to about 20 μm.

In an exemplary embodiment, a thickness of the second hard coating layer may be thicker than a thickness of the first hard coating layer and a thickness of the third hard coating layer.

In an exemplary embodiment, a ratio of a sum of a thickness of the first hard coating layer and a thickness of the third hard coating layer, and a thickness of the second hard coating layer, may be about 1:1.5 to about 1.5:1.

In an exemplary embodiment, a sum of a thickness of the first hard coating layer, a thickness of the second hard coating layer, and a thickness of the third hard coating layer may be about 40 μm to about 60 μm.

A display device according to an exemplary embodiment of the present inventive concepts includes: a cover window; and a display panel that is disposed on one side of the cover window, wherein the cover window includes: a base layer; a first hard coating layer that is disposed on one side of the base layer; a second hard coating layer that is disposed on the first hard coating layer; and a third hard coating layer that is disposed on the second hard coating layer, the first hard coating layer and the third hard coating layer include an acryl-based organic-inorganic material and the second hard coating layer includes a silicon-based or epoxy-based organic-inorganic material, or the first hard coating layer and the third hard coating layer include a silicon-based or epoxy-based organic-inorganic material and the second hard coating layer includes an acryl-based organic-inorganic material, and a hard coating layer is not provided between a base layer of the cover window and the display panel.

According to an exemplary embodiment of the present inventive concepts, a cover window includes a base layer. A first hard coating layer is disposed on a first side of the base layer. A second hard coating layer is disposed on the first hard coating layer. A third hard coating layer is disposed on the second hard coating layer. A fourth hard coating layer is disposed on the third hard coating layer. The first hard coating layer and the third hard coating layer comprise an acryl-based organic-inorganic material and the second hard coating layer and the fourth hard coating layer each comprise one material selected from a silicon-based organic-inorganic material and an epoxy-based organic-inorganic material; or the first hard coating layer and the third hard coating layer each comprise one material selected from the silicon-based organic-inorganic material and the epoxy-based organic-inorganic material and the second hard coating layer and the fourth hard coating layer comprise the acryl-based organic-inorganic material.

In an exemplary embodiment, the acryl-based organic-inorganic material may be polysilsesquioxane containing an acryl group, the silicon-based organic-inorganic material may be polysilsesquioxane containing a silicone group, and the epoxy-based organic-inorganic material may be polysilsesquioxane containing an epoxy group.

In an exemplary embodiment, a thickness of each of the first hard coating layer, the second coating layer, the third hard coating layer, and the fourth hard coating layer may be about 10 μm to about 15 μm.

In an exemplary embodiment, a ratio of a sum of a thickness of the first hard coating layer and a thickness of the third hard coating layer and a sum of a thickness of the second hard coating layer and a thickness of the fourth coating layer may be about 1:1.5 to about 1.5:1.

In an exemplary embodiment, a sum of a thickness of each of the first hard coating layer, the second hard coating layer, the third hard coating layer, and the fourth hard coating layer may be about 40 μm to 60 μm.

A display device according to an exemplary embodiment of the present inventive concepts includes: a cover window; and a display panel that is disposed on the cover window, wherein the cover window includes: a base layer; a first hard coating layer that is disposed on one side of the base layer; a second hard coating layer that is disposed on the first hard coating layer; a third hard coating layer that is disposed on the second hard coating layer; and a fourth hard coating layer that is disposed on the third hard coating layer, wherein the first hard coating layer and the third hard coating layer include the same material, the second hard coating layer and the fourth hard coating layer include the same material, and the first hard coating layer and the third hard coating layer include an acryl-based organic-inorganic material and the second hard coating layer and the fourth hard coating layer include a silicon-based or epoxy-based organic-inorganic material, or the first hard coating layer and the third hard coating layer include a silicon-based or epoxy-based organic-inorganic material and the second hard coating layer and the fourth hard coating layer include an acryl-based organic-inorganic material, and a hard coating layer may not be provided between a base layer of the cover window and the display panel.

According to an exemplary embodiment of the present inventive concepts, a cover window includes a base layer. At least one first hard coating layer is disposed on a first side of the base layer that includes an acryl-based organic-inorganic material. At least one second hard coating layer is disposed on the first side of the base layer that each includes at least one material selected from a silicon-based organic-inorganic material and an epoxy-based organic-inorganic material. A ratio of an entire thickness of the at least one first hard coating layer to an entire thickness of the at least one second hard coating layer is in a range of about 1:1.5 to about 1.5:1.

According to the exemplary embodiments, a cover window that can prevent bending of a cover window, and a display device including the same can be provided.

DETAILED DESCRIPTION OF EXEMPLARY EMBODIMENTS

Figure 1:
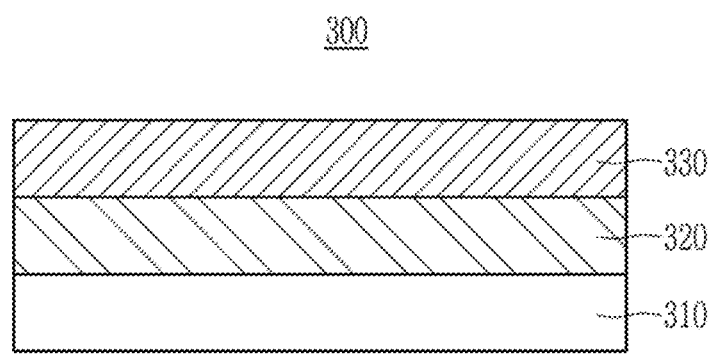
FIG. 1 shows a cross-sectional view of a cover window according to an exemplary embodiment of the present inventive concepts.

Exemplary embodiments of the present inventive concepts will be described in detail with reference to the accompanying drawings. The size and thickness of each component shown in the drawing are arbitrarily shown for better understanding and ease of description.

The drawings and description are to be regarded as illustrative in nature and not restrictive. Like reference numerals designate like elements throughout the specification.

Further, in the drawings, sizes and thicknesses of each element are arbitrarily represented for better understanding and ease of description. However, exemplary embodiments of the present inventive concepts are not limited thereto. In the drawings, the thicknesses of layers, films, panels, regions, etc., may be exaggerated for clarity. In the drawings, the thicknesses of some layers and regions are exaggerated for better understanding and ease of description.

It will be understood that when an element such as a layer, film, region, or substrate is referred to as being "on" another element, it may be directly on the other element or intervening elements may also be present. In contrast, when an element is referred to as being "directly on" another element, there are no intervening elements present. The word "on" or "above" means positioned on or below the object portion, and does not necessarily mean positioned on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

Further, in this specification, the phrase "on a plane" means viewing a target portion from the top, and the phrase "on a cross-section" means viewing a cross-section formed by vertically cutting a target portion from the side.

Hereinafter, a cover window according to an exemplary embodiment of the present inventive concepts will be described with reference to the accompanying drawings.

FIG. 1 is a cross-section of a cover window according to an exemplary embodiment of the present inventive concepts. Referring to FIG. 1, a cover window 300 according to an exemplary embodiment of the present inventive concepts includes a base layer 310, a first hard coating layer 320 disposed on the base layer 310, and a second hard coating layer 330 disposed on the first hard coating layer 320. For example, as shown in the exemplary embodiment of FIG. 1, a lower surface of the first hard coating layer 320 may directly contact a first side of the base layer 310 which is an upper surface of the base layer 310. An upper surface of the first hard coating layer 320 may directly contact a lower surface of the second hard coating layer 330. In the cover window according to the present exemplary embodiment, the first and second hard coating layers 320, 330 include materials in which directions of curling that occurs during a curing process are aligned opposite to each other. The first and second hard coating layers 320, 330 are stacked on each other such that bending of the cover window may be minimized even when the first and second hard coating layers 320, 330 are thickened by multi-layering the first and second hard coating layers 320, 330.

Hereinafter, constituent elements of the cover window 300 according to the present exemplary embodiment will be described in detail.

In an exemplary embodiment, the base layer 310 may include a plastic material. For example, the base layer 310 may have a thickness in a range of about 500 μm to about 1000 μm. However, exemplary embodiments of the present inventive concepts are not limited thereto.

In an exemplary embodiment, the base layer 310 may include a polymer compound. For example, the base layer 310 may include at least one compound selected from polyimide, polyacrylate, polyethylene ether phthalate, polyethylene naphthalate, polycarbonate, polyarylate, polyetherimide, polyethersulfone, poly(methylmethacrylate), triacetic acid cellulose, polyvinylidene chloride, polyvinylidene fluoride, and an ethylene-vinyl alcohol copolymer. However, exemplary embodiments of the present inventive concepts are not limited thereto.

In an exemplary embodiment, the first hard coating layer 320 may include an acryl-based organic-inorganic material. For example, in an exemplary embodiment, the first hard coating layer 320 may include polysilsesquioxane, and the polysilsesquioxane may include an acryl group. For example, the first hard coating layer may include polysilsesquioxane containing an acryl group.

A thickness of the first hard coating layer 320 may be in a range of about 10 μm to about 30 μm.

In an exemplary embodiment, the first hard coating layer 320 may further include an additive. The content of the additive may be about 20 wt % or less with respect to the entire first hard coating layer 320. For example, the additive may be urethane acrylate. However, exemplary embodiments of the present inventive concepts are not limited thereto. Urethane acrylate has excellent properties with respect to wear resistance, stiffness, and fracture resistance, and thus it can improve the characteristics of the first hard coating layer 320.

In an exemplary embodiment, the second hard coating layer 330 may include silicon-based organic-inorganic materials or epoxy-based organic-inorganic materials. For example, the second hard coating layer 330 may include polysilsesquioxane, and the polysilsesquioxane may include a silicone group or an epoxy group. For example, the second hard coating layer 330 may include polysilsesquioxane containing a silicone group or an epoxy group.

In an exemplary embodiment, the second hard coating layer 330 may have a thickness in a range of about 10 μm to about 30 μm.

The curl direction may be controlled according to a functional group connected to Si of polysilsesquioxane. For example, the curling direction differs depending on whether the functional group has a contracting characteristic or an expanding characteristic. The curling direction may be a direction with respect to a thickness direction of the cover window 300.

In the previously described exemplary embodiment, the first hard coating layer 320 includes the acryl-based organic-inorganic material and the second hard coating layer 330 includes the silicon-based or epoxy-based organic-inorganic material. However, exemplary embodiments are not limited thereto and the opposite configuration is also included in the present inventive concepts.

For example, in another exemplary embodiment, the first hard coating layer 320 may include a silicon-based or epoxy-based organic-inorganic material, and the second hard coating layer 330 may include an acryl-based organic-inorganic material. For example, the first hard coating layer 320 may include polysilsesquioxane, and the polysilsesquioxane may include a silicone group or an epoxy group and the second hard coating layer 330 may include polysilsesquioxane, and the polysilsesquioxane may include an acryl group.

The acryl-based organic-inorganic material of one of the layers selected from the first and second hard coating layers 320, 330 and the epoxy-based organic-inorganic material of the other layer selected from the first and second hard coating layers 320, 330 may be curled in opposite directions during a curing process. For example, the first and second hard coating layers 320, 330 may be curled in opposite directions with respect to a thickness direction of the cover window 300 during the curing process. Therefore, even in instances in which the first hard coating layer 320 and the second hard coating layer 330 are formed relatively thick, the first and second hard coating layers 320, 330 are curled in opposite directions with respect to each other during a curling process, and the force in the opposite directions is canceled out, thereby preventing the cover window from bending.

Figure 2:
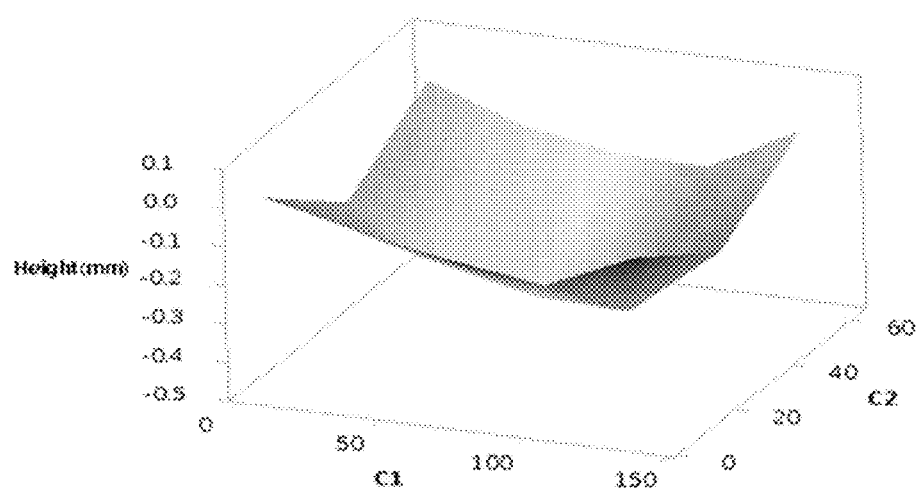
FIG. 2 shows a perspective view of a simulation result of a bending direction of the acryl-based organic-inorganic material during curing.

FIG. 2 shows a simulation result of a bending direction of the acryl-based organic-inorganic material during curing. Referring to FIG. 2, in the case of acryl-based material, it can be seen that curling occurs in a positive direction, such as in an upward direction in the thickness direction of the cover window 300.

Figure 3:
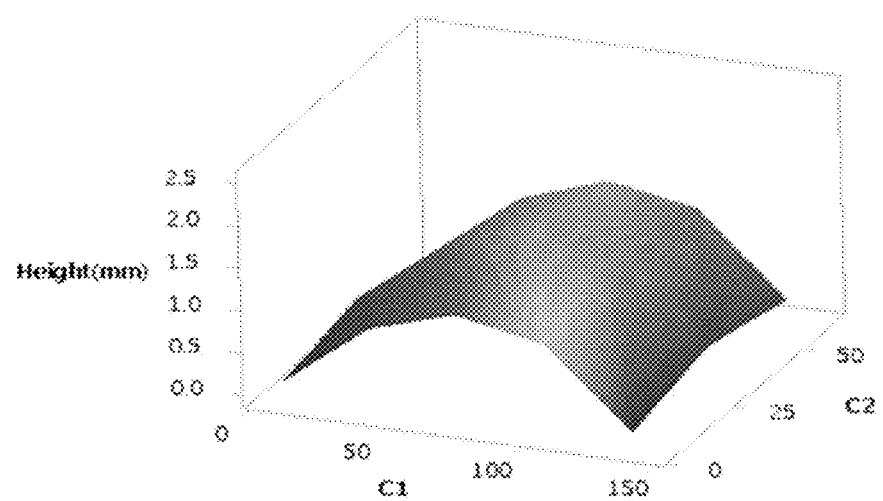
FIG. 3 shows a perspective view of a simulation result of a bending direction of the silicon-based organic-inorganic material during curing.

FIG. 3 shows a simulation result of a bending direction of the silicon-based organic-inorganic material during curing.

Referring to FIG. 3, in the case of the silicon-based material, it can be seen that curling occurs in a reverse direction, such as in a downward direction in the thickness direction of the cover window 300. The direction that the epoxy-based organic-inorganic material may curl during a curing process may be similar to the direction that the silicon-based material curls during the curing process.

layer 330 may be about 50% or less. For example, a ratio of the thickness of the first hard coating layer 320 to the thickness of the second hard coating layer 330 may be in a range of about 1:1.5 to 1.5:1.

Table 1 shows results after measuring hardness and bending by varying a material and a thickness of the first hard coating layer and the second hard coating layer.

TABLE 1

|  | First hard coating layer | | Second hard coating layer | | Hard-ness | Bending (mm) | After reliability (85° C./ 85%) | Foreign Substance |
|---|---|---|---|---|---|---|---|---|
|  | Material | Thickness (μm) | Material | Material | | | | |
| Experimental Example 1 | Acryl based organic-inorganic material | 20 | Silicon-based organic-inorganic material | 30 | 8 H | +0.6 | +0.5 | No |
| Experimental Example 2 | Acryl-based organic-inorganic material | 20 | Silicon-based organic-inorganic material | 40 | 9 H | +1.8 | +1.2 | No |
| Experimental Example 3 | Acryl-based organic-inorganic material | 45 | Acryl-based organic-inorganic material | 5 | 8 H | +1.5 | +1.8 | Yes |

Therefore, when the hard coating layer is formed to be multi-layered, one layer includes a material that causes curling in the forward direction, and the other layer includes a material that causes curling in the reverse direction, so the forward curling force and the reverse direction force are canceled out. Accordingly, even though the hard coating layers are formed thick, it is possible to prevent bending from occurring during the curing process.

In the present exemplary embodiment, the sum of the thickness of the first hard coating layer 320 and the thickness of the second hard coating layer 330 may be about 40 μm or more. When the sum of the thicknesses of the first hard coating layer 320 and the second hard coating layer 330 is less than 40 μm, sufficient hardness may not be provided. Therefore, the sum of the first hard coating layer 320 and the second hard coating layer 330 may be about 40 μm or more to provide a hardness of about 8H or more. For example, in an exemplary embodiment, the sum of the thickness of the first hard coating layer 320 and the thickness of the second hard coating layer 330 may be in a range of about 40 μm to about 60 μm.

In this embodiment in which a hard coating layer having a thickness of about 40 μm or more is formed as a single layer, bending may occur during a curing process. However, when the hard coating layer is formed as multi-layers as in the present exemplary embodiment, curling directions occurring in the respective layers are opposite to each other such that the curling forces of each layer are canceled out, thereby preventing the cover window from being bent during the curing process.

In an exemplary embodiment, the thickness of the first hard coating layer 320 and the thickness of the second hard coating layer 330 may be the same as or similar to each other. For example, to stably cancel out the curling force in the opposite direction, the difference in thickness between the first hard coating layer 320 and the second hard coating Comparing Experimental Example 1 and Experimental Example 3, even when the sums of the thicknesses of the first and second hard coating layers are equal to each other at 50 μm, bending occurred less in Exemplary Embodiment 1 in which a first hard coaling layer and a second hard coating layer include different materials comprising an acryl-based organic-inorganic material and a silicon-based organic-inorganic material, respectively, than in Exemplary Embodiment 3 in which a first hard coating layer and a second hard coating layer include the same material comprising an acryl-based organic-inorganic material. In addition, comparing Experimental Example 1 and Experimental Example 2, less bending occurred in Exemplary Embodiment 1 in which a thickness ratio between the first hard coating layer and the second hard coating layer is 1:1.5 than in Experimental Example 2 in which the thickness ratio between the first hard coating layer and the second hard coating layer is 1:2. The difference in the thicknesses of the first hard coating layer and second hard coating layer of 20 μm in Experimental Example 2 is two times greater than the difference in the thicknesses of the first hard coating layer and second hard coating layer in Experimental Example 1.

In the cover window according to exemplary embodiments of the present inventive concepts, the first hard coating layer 320 and the second hard coating layer 330 include different materials such that occurrence of bending may be prevented even when the thickness of the hard coating layer is increased.

In addition, as shown in the exemplary embodiment of FIG. 1, in the cover window 300 according to exemplary embodiments of the present inventive concepts, the hard coating layer may be disposed on only one side of the base layer 310 and may not be disposed on the other side thereof. For example, as shown in the exemplary embodiment of FIG. 1, the first and second hard coating layers 320, 330 may be disposed on a first side of the base layer 310 which is an upper side of the base layer 310.

In general, the hard coating layers of the cover window 300 may be disposed on opposite sides of the base layer 310, such as on an upper and lower side of the base layer 310. When the hard coating layers are disposed on opposite sides, the bending force may be canceled by the hard coating layers on both sides such that the cover window may not be bent.

Figure 4:
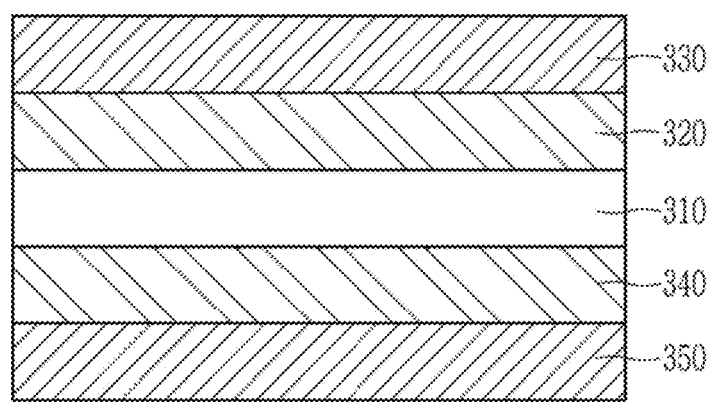
FIG. 4 shows a cross-sectional view of a cover window in which hard coating layers are disposed on opposite sides of a base layer according to an exemplary embodiment of the present inventive concepts.

FIG. 4 shows an exemplary embodiment in which hard coating layers are disposed on opposite sides of a base layer 310. Referring to the exemplary embodiment of FIG. 4, a first hard coating layer 320 and a second hard coating layer 330 are disposed on a first side of a base layer 310, such as an upper side of the base layer 310. A third hard coating layer 340 and a fourth hard coating layer 350 are disposed on the opposite second side of the base layer 310, such as the lower side of the base layer 310.

In the exemplary embodiment of FIG. 4, the hard coating layers are disposed on both sides of the base layer 310, and thus even though the thickness is increased, the cover window 300 may be prevented from being bent. However, in instances in which an impact is applied to one side of the cover window 300 where the hard coating layers are positioned on both sides of the base layer 310, the impact may be concentrated on the hard coating layer on the opposite side and a crack may occur. In addition, when the cover window 300 is bent, cracks may occur in the hard coating layer on the side where tension occurs.

However, in the cover window 300 according to an exemplary embodiment of the present inventive concepts, the hard coating layer is positioned on only the first side of the base layer 310 and the hard coating is not positioned on the opposite second side of the base layer 310. Therefore, the occurrence of cracks may be prevented when the impact is concentrated or the cover widow 300 is bent.

When the coating layer is positioned only one side of the base layer 310 in cover windows in the related art, the curling force in the curing process of the coating layer is not canceled out and the cover window may be bent. However, in the exemplary embodiment of the present inventive concepts, materials that curl in different directions are multi-layered such that the curling forces during the curing process are canceled out, thereby preventing the cover window 300 from being bent.

Figure 5:
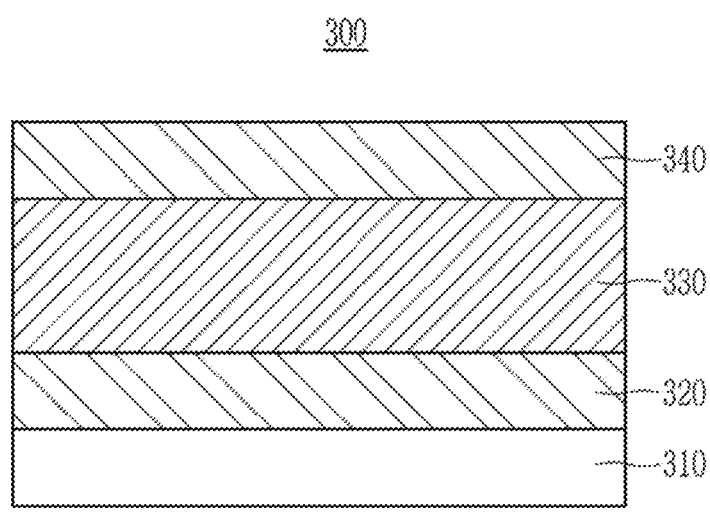
FIG. 5 shows a cross-sectional view of a cover window according to another exemplary embodiment of the present inventive concepts.

Hereinafter, another exemplary embodiment of the present inventive concepts will be described. FIG. 5 shows the same cross-sectional view shown in FIG. 1 with respect to another exemplary embodiment of the present inventive concepts. Referring to FIG. 5, the present exemplary embodiment is different from the exemplary embodiment of FIG. 1 based on the cover window 300 having a triple-layered structure rather than having a double-layered structure as shown in the exemplary embodiment of FIG. 1.

For example, the display device according to the exemplary embodiment of FIG. 5 further includes a third hard coating layer 340 in addition to a first hard coating layer 320 and a second hard coating layer 330 that are sequentially layered on a first side of the base layer 310. For example, as shown in the exemplary embodiment of FIG. 5, the first side of the base layer 310 may be the upper side of the base layer 310.

The second hard coating layer 330 is disposed between the first hard coating layer 320 and the third hard coating layer 340. For example, as shown in the exemplary embodiment of FIG. 5, a lower surface of the second hard coating layer 330 may directly contact an upper surface of the first hard coating layer 320 and an upper surface of the second hard coating layer 330 may directly contact a lower surface of the third hard coating layer 340.

The first hard coating layer 320 and the third hard coating layer 340 may include materials that curl in the same direction, and the second hard coating layer 330 may include a material that curls in the opposite direction to the first hard coating layer 320 and third hard coating layer 340.

For example, in an exemplary embodiment in which the first hard coating layer 320 and the third hard coating layer 340 include an acryl-based organic-inorganic material, the second hard coating layer 330 may include a silicon-based or epoxy-based organic/inorganic material. For example, first hard coating layer 320 and third hard coating layer 340 may include polysilsesquioxane containing an acryl group, and the second hard coating layer 330 may include polysilsesquioxane containing a silicone group or an epoxy group.

In another exemplary embodiment, the first hard coating layer 320 and the third hard coating layer may each include one material selected from a silicon-based organic-inorganic material and an epoxy-based organic-inorganic material, and the second hard coating layer 330 may include an acryl-based organic-inorganic material. For example, the first hard coating layer 320 and the third hard coating layer 340 may each include polysilsesquioxane containing a silicone group or an epoxy group, and the second hard coating layer 330 may include polysilsesquioxane containing an acryl group. In an exemplary embodiment, one layer selected from the first hard coating layer 320 and the third hard coating layer 340 may include polysilsesquioxane containing a silicone group and the other layer selected from the first hard coating layer 320 and the third hard coating layer 340 may include polysilsesquioxane containing an epoxy group. However, in other exemplary embodiments, the first hard coating layer 320 and the third hard coating layer 340 may include the same material.

In an exemplary embodiment, a sum of a thickness of the first hard coating layer 320 and a thickness of the third hard coating layer 340 may be the same as or similar to a thickness of the second hard coating layer 330. For example, a difference between the sum of the thicknesses of the first hard coating layer 320 and the third hard coating layer 340, and the thickness of the second hard coating layer 330, may be less than about 50%. For example, in the exemplary embodiment shown in FIG. 5, a ratio of the sum of the thicknesses of the first hard coating layer 320 and the third hard coating layer 340, and the thickness of the second hard coating layer 330, may be about 1:1.5 to about 1.5:1.

In an exemplary embodiment, the entire thickness of the hard coating layer including the first hard coating layer 320, the second hard coating layer 330, and the third hard coating layer 340 may be in a range of about 40 μm to about 60 μm. For example, in an exemplary embodiment, the thicknesses of each of the first hard coating layer 320 and the third hard coating layer 340 may be in a range of about 10 μm to about 20 μm. The thickness of the second hard coating layer 330 may be larger than the thickness of the first hard coating layer 320 and the thickness of the third hard coating layer 340. When the entire thickness of the hard coating layer is less than about 40 μm, the hard coating layer may not have sufficient hardness, and when the entire thickness exceeds about 60 μm, the curling forces may not be sufficiently canceled out.

Figure 6:
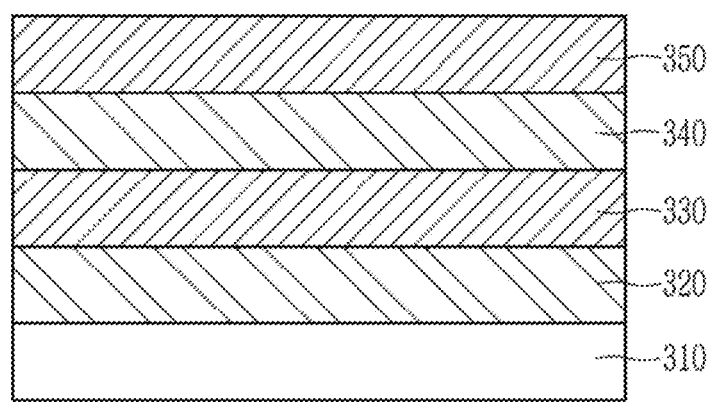
FIG. 6 shows a cross-sectional view of a cover window according to another exemplary embodiment of the present inventive concepts.

Hereinafter, another exemplary embodiment of the present inventive concepts will be described. FIG. 6 shows the same cross-sectional view shown in FIG. 1 with respect to another exemplary embodiment of the present inventive concepts. Referring to FIG. 6, the present exemplary embodiment is different from the exemplary embodiment of FIG. 1 on the basis that the cover window 300 has a fourfold-layered structure rather than having a double-layered structure.

For example, the display device according to the exemplary embodiment of FIG. 6 includes a first hard coating layer 320, a second hard coating layer 330, a third hard coating layer 340, and a fourth hard coating layer 350 that are sequentially layered on a first side of the base layer 310. For example, as shown in the exemplary embodiment of FIG. 6, the first side of the base layer 310 may be the upper side of the base layer 310.

In this exemplary embodiment, the first hard coating layer 320 and the third hard coating layer 340 may include a material that curls in the same direction during the curing process and the second hard coating layer 330 and the fourth hard coating layer 350 may include a material that curls in the opposite direction during the curing process than the material of the first hard coating layer 320 and the third hard coating layer 340. For example, in an exemplary embodiment, the first hard coating layer 320 and the third hard coating layer 340 may include the same material, and the second hard coating layer 330 and the fourth hard coating layer 350 may include the same material.

In an exemplary embodiment, the first hard coating layer 320 and the third hard coating layer 340 may include an acryl-based organic-inorganic material. For example, the first hard coating layer 320 and the third hard coating layer 340 may include polysilsesquioxane containing an acryl group. In this exemplary embodiment, the second hard coating layer 330 and the fourth hard coating layer 350 may include a silicon-based or epoxy-based organic-inorganic material. For example, the second hard coating layer 330 and the fourth hard coating layer 350 may include polysilsesquioxane containing a silicone group or an epoxy group.

However, in another exemplary embodiment, the first hard coating layer 320 and the third hard coating layer 340 may each include one material selected from polysilsesquioxane containing a silicone group and polysilsesquioxane containing an epoxy group, and the second hard coating layer 330 and the fourth hard coating layer 350 may include polysilsesquioxane containing an acryl group.

A thickness of each of the first hard coating layer 320, the second hard coating layer 330, the third hard coating layer 340, and the fourth hard coating layer 350 may be in a range of about 10 μm to about 15 μm.

In an exemplary embodiment, a sum of the thicknesses of the first hard coating layer 320 and the third hard coating layer 340 is the same as or similar to a sum of the thicknesses of the second hard coating layer 330 and the fourth hard coating layer 350. For example, a difference between the sum of the thicknesses of the first hard coating layer 320 and the third hard coating layer 340 and the sum of the thicknesses of the second hard coating layer 330 and the fourth hard coating layer 350 may be less than about 50% to stably cancel off curling forces of the opposite directions. For example, in the exemplary embodiment of FIG. 5, a ratio of the sum of the thicknesses of the first hard coating layer 320 and the third hard coating layer 340 to the sum of the thicknesses of the second hard coating layer 330 and the fourth hard coating layer 350 may be in a range of about 1:1.5 to about 1.5:1.

In the exemplary embodiment of FIG. 5, the entire thickness of the hard coating layer including the first hard coating layer 320, the second hard coating layer 330, the third hard coating layer 340, and the fourth hard coating layer 350 may be in a range of about 40 μm to about 60 μm. When the entire thickness of the hard coating layer is less than 40 μm, the hard coating layer may have sufficient hardness, and when the entire thickness exceeds 60 μm, the curling forces may not be sufficiently canceled out.

Figure 7:
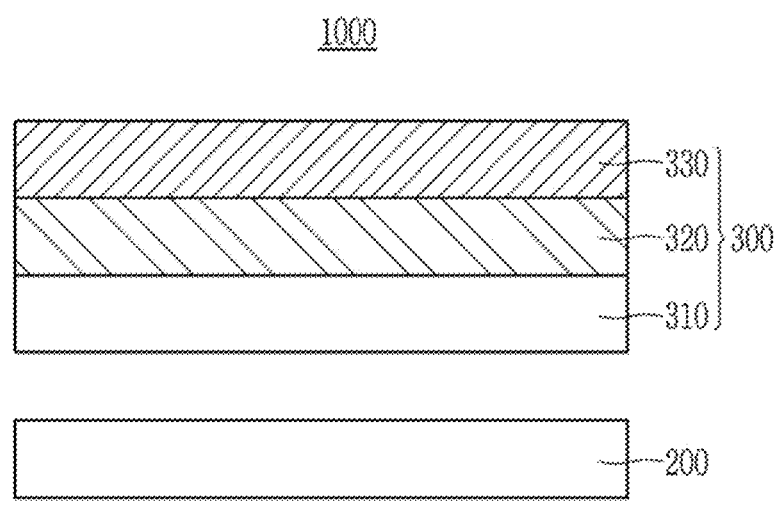
FIGS. 7 to 9 shows cross-sectional views of display devices according to exemplary embodiments of the present inventive concepts.
Figure 8:
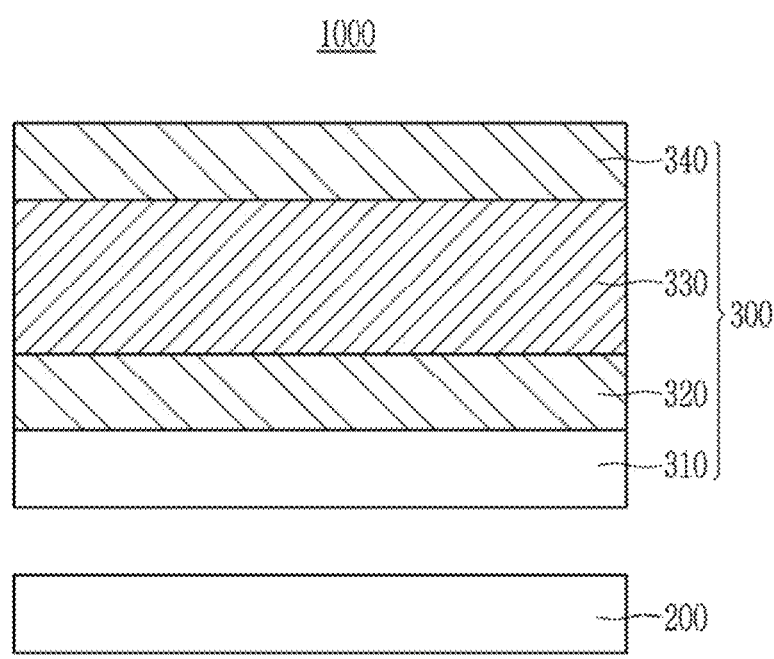
Figure 9:
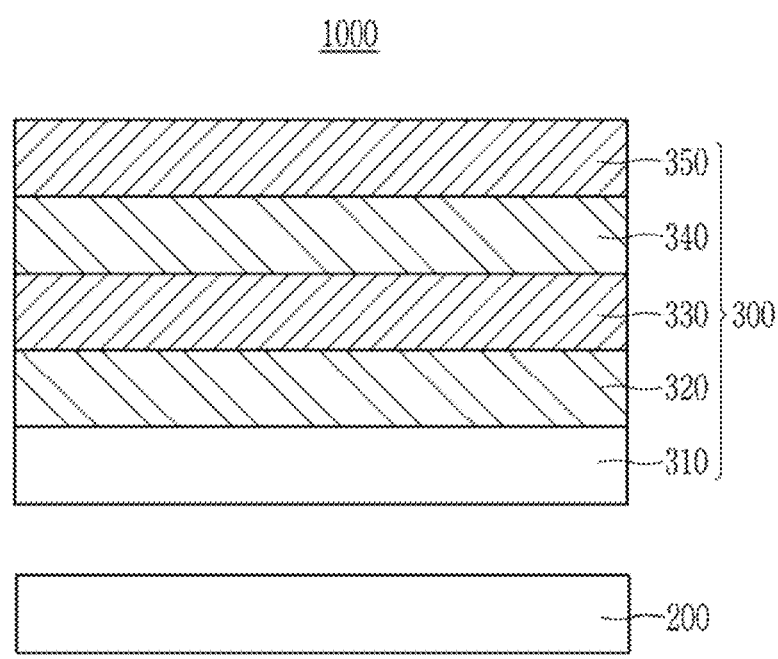

While the exemplary embodiments of FIGS. 1, 5, 6 show the cover window 300 including two, three and four hard coating layers disposed on the first side of the base layer 310, exemplary embodiments of the present inventive concepts are not limited thereto. For example, in other exemplary embodiments, the cover window 300 may include at least one first hard coating layer disposed on the first side of the base layer 310 that includes an acryl-based organic-inorganic material and at least one second hard coating layer disposed on the first side of the base layer that each includes at least one material selected from a silicon-based organic-inorganic material and an epoxy-based organic-inorganic material. The layers of the at least one first hard coating layer and the at least one second hard coating layer may be variously arranged on the first side of the base layer 310. In an exemplary embodiment, an entire sum of the thicknesses of the at least one first hard coating layer and the at least one second hard coating layer may be in a range of about 40 μm to about 60 μm. The ratio of an entire thickness of the at least one first hard coating to an entire thickness of the at least one second hard coating layer may be in a range of about 1:1.5 to about 1.5:1. Hereinafter, display devices according to exemplary embodiments of the present inventive concepts will be described in detail with reference to the accompanying drawings. FIGS. 7 to 9 respectively illustrate display devices according to exemplary embodiments of the present inventive concepts.

Referring to the exemplary embodiment of FIG. 7, a display device 1000 according to the present exemplary embodiment includes a display panel 200 and a cover window 300 disposed on a first side of the display panel 200. For example, as shown in the exemplary embodiment of FIG. 7, the first side of the display panel 200 may be an upper side of the display panel. The cover window 300 may be the cover window 300 according to the exemplary embodiment of FIG. 1. The detailed description of the same constituent elements is omitted for convenience of explanation.

Referring to FIG. 7, in the display device according to the present exemplary embodiment, a hard coating layer is not provided between the display panel 200 and the base layer 310. Therefore, the entire thickness of the display panel 200 may be relatively thin, and when an impact is applied to the cover window 300, a problem of the generation of cracks in a hard coating layer disposed between the base layer 310 and the display panel 200 may be prevented.

A display device shown in the exemplary embodiment of FIG. 8 is the same as the display device of the exemplary embodiment of FIG. 7, except that a structure of a cover window 300 is not the structure shown in the exemplary embodiment of FIG. 1 but is the structure shown in the exemplary embodiment of FIG. 5. The detailed description of the same constituent elements is omitted for convenience of explanation.

For example, referring to the exemplary embodiment of FIG. 8, similar to the exemplary embodiment of FIG. 7, a hard coating layer is not provided between a display panel 200 and a base layer 310. Therefore, the entire thickness of the display panel 200 may be relatively thin, and when an impact is applied to the cover window 300, a problem of the generation of cracks in a hard coating layer disposed between the base layer 310 and the display panel 200 may be prevented. The cover window 300 of the exemplary embodiment of FIG. 8 is the same as the cover window described with reference to the exemplary embodiment of FIG. 5, and therefore a detailed description of the same constituent elements is omitted for convenience of explanation.

A display device shown in the exemplary embodiment of FIG. 9 is the same as the display device of the exemplary embodiment of FIG. 7, except that a structure of a cover window 300 is not the structure shown in the exemplary embodiment of FIG. 1 but is the structure shown in the exemplary embodiment of FIG. 6. The detailed description of the same constituent elements is omitted for convenience of explanation.

Referring to the exemplary embodiment of FIG. 9, as in the exemplary embodiment of FIG. 7, a hard coating layer is not provided between a display panel 200 and a base layer 310. Therefore, the entire thickness of the display panel 200 may be relatively thin, and when an impact is applied to the cover window 300, a problem of the generation of cracks in a hard coating layer disposed between the base layer 310 and the display panel 200 may be prevented.

As described, in the cover window according to the exemplary embodiment of the present inventive concepts and the display device including the same, the hard coating layer is multi-layered on a first side of the base layer 310, and a hard coating layer that curls in a positive direction and a hard coating layer that curls in the reverse direction during the curing process have similar thicknesses. Therefore, it is possible to prevent the problem of the cover window bending due to the curling of the hard coating layer during a curing process, and the cover window can be relatively thin and cracks may be prevented from forming.

While the present inventive concepts have been described in connection with exemplary embodiments, it is to be understood that the present inventive concepts are not limited to the disclosed exemplary embodiments and includes various modifications and equivalent arrangements.

What is claimed is:

1. A cover window comprising:
   a base layer;
   a first hard coating layer disposed directly on a first side of the base layer; and
   a second hard coating layer disposed directly on the first hard coating layer,
   wherein the first hard coating layer comprises an acryl-based organic-inorganic material and the second hard coating layer comprises polysilsesquioxane containing a silicone group, or
   the first hard coating layer comprises the polysilsesquioxane containing the silicone group and the second hard coating layer comprises the acryl-based organic-inorganic material,
   wherein a curl direction of the first hard coating layer or the second hard coating layer is controlled according to a functional group connected to Si of polysilsesquioxane, and
   wherein the curl direction of the first hard coating layer is opposite to the curl direction of the second hard coating layer and forces of curling of the first hard coating layer and the second hard coating layer cancel out each other.

2. The cover window of claim 1, wherein:
   the acryl-based organic-inorganic material is polysilsesquioxane containing an acryl group.

3. The cover window of claim 1, wherein a thickness of the first hard coating layer and a thickness of the second hard coating layer are each in a range of about 10 µm to about 30 µm.

4. The cover window of claim 1, wherein a ratio of a thickness of the first hard coating layer to a thickness of the second hard coating layer is in a range of about 1:1.5 to about 1.5:1.

5. The cover window of claim 1, wherein a sum of a thickness of the first hard coating layer and a thickness of the second hard coating layer is in a range of about 40 µm to about 60 µm.

6. A display device comprising:
   a display panel; and
   the cover window of claim 1 disposed on a first side of the display panel;
   wherein the display device does not include a hard coating layer disposed between the base layer of the cover window and the display panel.

7. A cover window comprising:
   a base layer;
   a first hard coating layer disposed directly on a first side of the base layer;
   a second hard coating layer disposed directly on the first hard coating layer; and
   a third hard coating layer disposed directly on the second hard coating layer, the third hard coating layer is an uppermost coating layer,
   wherein the first hard coating layer and the third hard coating layer comprise a respective polysilsesquioxane containing an acryl group and the second hard coating layer comprises polysilsesquioxane containing a silicone group, or
   the first hard coating layer and the third hard coating layer each comprise the polysilsesquioxane containing a silicone group and the second hard coating layer comprises the polysilsesquioxane containing an acryl group,
   wherein a curl direction of the first hard coating layer, second hard coating layer and third hard coating layer is controlled according to a functional group connected to Si of polysilsesquioxane, and
   wherein the curl direction of the first hard coating layer and the third hard coating layer is opposite to the curl direction of the second hard coating layer and forces of curling of the first hard coating layer, second hard coating layer and third hard coating layer cancel out each other.

8. The cover window of claim 7, wherein a thickness of the first hard coating layer and a thickness of the third hard coating layer are each in a range of about 10 µm to about 20 µm.

9. The cover window of claim 7, wherein a thickness of the second hard coating layer is larger than a thickness of the first hard coating layer and a thickness of the third hard coating layer.

10. The cover window of claim 7, wherein a ratio of a sum of thicknesses of the first hard coating layer and the third hard coating layer to a thickness of the second hard coating layer is in a range of about 1:1.5 to about 1.5:1.

11. The cover window of claim 7, wherein a sum of a thickness of the first hard coating layer, a thickness of the second hard coating layer, and a thickness of the third hard coating layer is in a range of about 40 µm to about 60 µm.

12. The cover window of claim 7, wherein:
   the first hard coating layer and the third hard coating layer comprise a respective polysilsesquioxane containing an acryl group and the second hard coating layer comprises polysilsesquioxane containing a silicone group, or the first hard coating layer and the third hard coating layer each comprise the polysilsesquioxane containing the silicone group and the second hard coating layer comprises the polysilsesquioxane containing the acryl group.

13. A display device comprising:

a display panel; and the cover window of claim 7 disposed on a first side of the display panel; and wherein the display device does not include a hard coating layer disposed between the base layer of the cover window and the display panel.

14. A cover window comprising:

a base layer;

a first hard coating layer that is disposed on a first side of the base layer;

a second hard coating layer that is disposed on the first hard coating layer;

a third hard coating layer that is disposed on the second hard coating layer; and a fourth hard coating layer that is disposed on the third hard coating layer, the first hard coating layer and the third hard coating layer comprise an acryl-based organic-inorganic material and the second hard coating layer and the fourth hard coating layer each comprise a silicon-based organic-inorganic material, or the first hard coating layer and the third hard coating layer each comprise the silicon-based organic-inorganic material and the second hard coating layer and the fourth hard coating layer comprise the acryl-based organic-inorganic material, wherein a curl direction of the first hard coating layer or the second hard coating layer is controlled according to a functional around connected to Si of polysilsesquioxane, and wherein the curl direction of the first hard coating layer is opposite to the curl direction of the second hard coating layer and forces of curling of the first hard coating layer and the second hard coating layer cancel out each other.

15. The cover window of claim 14, wherein:

the acryl-based organic-inorganic material is polysilsesquioxane containing an acryl group; and the silicon-based organic-inorganic material is polysilsesquioxane containing a silicone group.

16. The cover window of claim 14, wherein a thickness of each of the first hard coating layer, the second coating layer, the third hard coating layer, and the fourth hard coating layer is in a range of about 10 μm to about 15 μm.

17. The cover window of claim 14, wherein a ratio of a sum of thicknesses of the first hard coating layer and the third hard coating layer to a sum of thicknesses of the second hard coating layer and the fourth coating layer is in a range of about 1:1.5 to about 1.5:1.

18. The cover window of claim 14, wherein a sum of a thickness of each of the first hard coating layer, the second hard coating layer, the third hard coating layer, and the fourth hard coating layer is in a range of about 40 μm to about 60 μm.

19. A display device comprising:

a display panel; and the cover window of claim 14 disposed on a first side of the display panel, wherein the display device does not include a hard coating layer disposed between the base layer of the cover window and the display panel.

20. A cover window comprising:

a base layer;

a plurality of first hard coating layers disposed on a first side of the base layer that includes an acryl-based organic-inorganic material;

a plurality of second hard coating layers, each of the plurality of the second hard coating layers directly disposed on a respective first hard coating layer of the plurality of first hard coating layers, each of the plurality of second hard coating layers includes polysilsesquioxane containing a silicone group; and a ratio of an entire thickness of the plurality of first hard coating layers to an entire thickness of the plurality of second hard coating layers is in a range of about 1:1.5 to about 1.5:1, wherein a curl direction of the second hard coating layer is controlled according to a functional group connected to Si of polysilsesquioxane, and wherein the curl direction of each of the plurality of first hard coating layers is opposite to the curl direction of each of the plurality of second hard coating layers and forces of curling of each of the plurality of first hard coating layers and each of the plurality of second hard coating layers directly disposed respectively thereon cancel out each other.

* * * * *